United States Patent
Kjems et al.

(10) Patent No.: US 9,224,393 B2
(45) Date of Patent: Dec. 29, 2015

(54) NOISE ESTIMATION FOR USE WITH NOISE REDUCTION AND ECHO CANCELLATION IN PERSONAL COMMUNICATION

(71) Applicants: OTICON A/S, Smørum (DK); Retune DSP ApS, Lyngby (DK)

(72) Inventors: Ulrik Kjems, Lyngby (DK); Jesper Jensen, Smørum (DK)

(73) Assignees: OTICON A/S, Smorum (DK); RETUNE DSP APS, Lyngby (DK)

( * ) Notice: Subject to any disclaimer, the term of this patent is extended or adjusted under 35 U.S.C. 154(b) by 318 days.

(21) Appl. No.: 13/967,055

(22) Filed: Aug. 14, 2013

(65) Prior Publication Data

US 2014/0056435 A1 Feb. 27, 2014

Related U.S. Application Data

(60) Provisional application No. 61/694,273, filed on Aug. 29, 2012.

(30) Foreign Application Priority Data

Aug. 24, 2012 (EP) .................................... 12181723

(51) Int. Cl.
*G10L 21/0208* (2013.01)
*G10L 15/20* (2006.01)
*H04R 3/00* (2006.01)
(Continued)

(52) U.S. Cl.
CPC .............. *G10L 15/20* (2013.01); *G10L 21/0232* (2013.01); *H04M 9/082* (2013.01); *H04R 3/005* (2013.01); *G10L 2021/02166* (2013.01); *H04R 1/1083* (2013.01); *H04R 3/02* (2013.01); *H04R 2225/43* (2013.01); *H04R 2227/009* (2013.01)

(58) Field of Classification Search
USPC ......... 381/66, 71.1, 71.11, 94.1, 94.2, 95, 96, 381/317
See application file for complete search history.

(56) References Cited

U.S. PATENT DOCUMENTS

2006/0106601 A1 5/2006 Kong et al.
2011/0228951 A1 9/2011 Sekiya et al.

OTHER PUBLICATIONS

Lefkimmiatis et al., "Optimum Post-Filter Estimation for Noise Reduction in Multichannel Speech Processing," In Proc. 14th European Signal Processing Conference, Sep. 4-8, 2006, (5 pages).

(Continued)

*Primary Examiner* — Duc Nguyen
*Assistant Examiner* — George Monikang
(74) *Attorney, Agent, or Firm* — Birch, Stewart, Kolasch & Birch, LLP (57) ABSTRACT

A method comprises processing M subband communication signals and N target-cancelled signals in each subband with a set of beamformer coefficients to obtain an inverse target-cancelled covariance matrix of order N in each band; using a target absence signal to obtain an initial estimate of the noise power in a beamformer output signal averaged over recent frames with target absence in each subband; multiplying the initial noise estimate with a noise correction factor to obtain a refined estimate of the power of the beamformer output noise signal component in each subband; processing the refined estimate with the magnitude of the beamformer output to obtain a postfilter gain value in each subband; processing the beamformer output signal with the postfilter gain value to obtain a postfilter output signal in each subband; and processing the postfilter output subband signals to obtain an enhanced beamformed output signal.

20 Claims, 5 Drawing Sheets

(51) Int. Cl.
    *G10L 21/0232*    (2013.01)
    *H04M 9/08*    (2006.01)
    *G10L 21/0216*    (2013.01)
    *H04R 1/10*    (2006.01)
    *H04R 3/02*    (2006.01)

(56) References Cited

OTHER PUBLICATIONS

Martin, "Noise Power Spectral Density Estimation Based on Optimal Smoothing and Minimum Statistics," IEEE Transactions on Speech and Audio Processing, vol. 9, No. 5, Jul. 2001, pp. 504-512.

McCowan et al., "Microphone Array Post-Filter Based on Noise Field Coherence," IEEE Transactions on Speech and Audio Processing, vol. 11, No. 6, Nov. 2003, pp. 709-716.

Wolff et al., "Spatial Maximum a Posteriori Post-Filtering for Arbitrary Beamforming," HSCMA, 2008, pp. 53-56.

Ye et al., "Maximum Likelihood DOA Estimation and Asymptotic Cramér-Rao Bounds for Additive Unknown Colored Noise," IEEE Transactions on Signal Processing, vol. 43, No. 4, Apr. 1995, pp. 938-949.

Zelinski, "A Microphone Array with Adaptive Post-Filtering for Noise Reduction in Reverberant Rooms," In Proc. IEEE International Conference on Acoustics, Speech and Signal Processing, vol. 5, 1988, pp. 2578-2581.

NOISE ESTIMATION FOR USE WITH NOISE REDUCTION AND ECHO CANCELLATION IN PERSONAL COMMUNICATION

CROSS REFERENCE TO RELATED APPLICATIONS

This non-provisional application claims priority under 35 U.S.C. 119(e) to U.S. Provisional Application No. 61/694,273 filed on Aug. 29, 2012, and under 35 U.S.C. 119(a) to patent application Ser. No. 12/181,723.3 filed in the European Patent Office on Aug. 24, 2012, all of which are hereby expressly incorporated by reference into the present application.

TECHNICAL FIELD

The present application relates to audio processing, in particular to speech enhancement, specifically to improving signal quality of a target speech signal in a noisy environment. The invention relates to estimation of the spectral inter-microphone correlation matrix of noise embedded in a multichannel audio signal obtained from multiple microphones present in an acoustical environment comprising one or more target sound sources and a number of undesired noise sources.

The invention may e.g. be used for deriving spectral signal-to-noise ratio estimates and forming spectral weights to be applied on a beamformer output signal in order to obtain an enhanced signal, where the target speech content is preserved and the noise components are significantly reduced.

Said spectral weights may e.g. be used to further reduce a residual echo signal that has escaped from an initial stage in an echo cancellation system.

The invention may e.g. be useful in applications such as headsets, hearing aids, active ear protection systems, mobile telephones, teleconferencing systems, karaoke systems, public address systems, mobile communication devices, handsfree communication devices, voice control systems, car audio systems, navigation systems, audio capture, video cameras, and video telephony.

BACKGROUND OF THE INVENTION

Background noise, reverberation and echo signals are typical causes of problems in systems for personal communication, and in systems involving automated recognition of voiced commands. Background noise and room reverberation can seriously decrease the sound quality and intelligibility of the desired speech signal. In a voice recognition system, background noise and reverberation increase the error rate. Furthermore, in some communication systems a speaker system delivers a known audio signal to the environment, which is picked up by a microphone array. For example, for a voice controlled TV-set it may be desired to disregard the echo of the television sound signal delivered to the loudspeakers when capturing voice commands. Similarly, in a telephone/voice communication setup, the far-end speech signal is delivered to one or more local loudspeakers, which produce an audio signal which is picked up by the local microphones as an undesirable echo. This echo should be removed before transmission of the near-end speech signal to the far-end. Similarly, a voice control system benefits from the removal of echo components.

Traditional methods for addressing background noise include beamforming and single channel noise reduction. Beamforming allows a differentiation of sound sources by employing a spatial filter, i.e. a filter where the gain of a signal depends on the spatial direction of the sound relative to the array of microphones. Multi-microphone enhancement methods can be seen as a concatenation of a beamformer algorithm and a single channel noise reduction algorithm; therefore multi-microphone methods can perform spatial filtering in addition to the spectro-temporal filtering offered by stand-alone single-channel systems.

The traditional method for echo cancellation is based on adaptively estimating the transfer functions from each loudspeaker signal to each of the microphone signals and subtracting an estimate of the echo from the microphone signals. However, certain components of the echo signals cannot be attenuated sufficiently by such methods, in particular in rooms with a long reverberation time. The part of the echo signal associated with late reverberation is often similar to ambient noise in that both sound fields are typically diffuse in nature. This is the primary reason that a multi-microphone spectral noise reduction system is also usable for removing the residual reverberant part of the echo signal.

The Multi Channel Wiener filter (MWF) for speech enhancement (see e.g. [3] Chapter 3.2) is an optimal linear estimator in mean-squared error sense of a target signal, given that the microphone signal consists of the target signal with additive uncorrelated noise. The MWF can be decomposed into a concatenation of a Minimum Variance Distortionless Response (MVDR) beam former and a single-channel Wiener post-filter. While these two systems are theoretically identical, the decomposed system is advantageous in practice over a brute-force implementation of the MWF filter. Specifically, one can exploit that the spatial signal statistics, which need to be estimated to implement the MVDR beamformer, change across time at a different (often slower) rate than the signal statistics that need to be estimated to implement the post-filter.

Most, if not all, post-filters rely on an estimate of the power spectral density (PSD) of the noise and undesired reverberation signal entering the post-filter. Considering a multi-microphone noise reduction system as a concatenation of a beamformer and a post-filter, it is obviously possible to estimate the noise PSD directly from the output signal of the beamformer, using well-known single-channel noise tracking algorithms (see e.g. [4] Section II, Eq. (1)-(3)). However, generally speaking, better performance can be obtained by taking advantage of having multiple microphone signals available when estimating the PSD of the noise entering the post-filter.

The idea of using multiple microphone signals for estimating the PSD of the noise that enters the post filter is not new. In [10] (FIG. 1), Zelinski used multiple microphone signals to estimate the noise PSD observed at the microphones under the assumption that the noise sequences were uncorrelated between microphones, i.e., the inter-microphone noise covariance matrix was diagonal. McCowan [11] (FIG. 1) and Lefkimmiatis [12] (FIG. 1) replaced this often unrealistic model with a diffuse (homogenous, isotropic) model of the noise field. More recently, Wolff [9] (FIG. 1) considered the beamformer in a generalized sidelobe canceller (GSC) structure, and used the output of a blocking matrix, combined with a voice activity detection (VAD) algorithm, to compute an estimate of the PSD of the noise entering the post-filter.

DESCRIPTION OF THE INVENTION

Herein we disclose a method and corresponding apparatus which estimate the time-varying and frequency-dependent inter-microphone noise covariance matrix, which unlike previously published methods and apparatus are optimal in a maximum likelihood sense.

In the described embodiments, the noise covariance matrix may be used for noise reduction, speech enhancement, and attenuation of residual echo signals, or for improving the recognition rate in a voice control system. It is an advantage of the invention that the noise is estimated accurately, because this may lead to an improved sound quality in the enhanced audio signal, or may improve the recognition rate of an automated voice control system.

In an embodiment, the spectral correlation matrix may be used for estimation of the noise level at the output of a beamformer that operates on a multichannel audio signal such as signals obtained from an array of two or more microphones. This noise estimate may be used for estimation of a signal-to-noise ratio at the beamformer output, which may be used for calculation of a frequency dependent gain weight to be applied in a post-filtering of the beamformer output. A further embodiment is described where the estimated noise level at the output of a beamformer that operates on the multichannel audio signal is used along with the beamformer output signal for automated voice command recognition.

Derivation of a Maximum Likelihood Method for Noise Power Estimation

In the following section, a noise power estimator is derived. Let the noisy signal impinging on the m'th microphone be given by $$y_m(n) = x_m(n) + v_m(n), m = 1 \ldots M$$

where $y_m(n)$, $x_m(n)$ and $v_m(n)$ denote signal samples of the noisy target signal, clean target signal, and noise signal, respectively, M is the number of available microphone signals, and where we have ignored analog-to-digital conversion and simply used the discrete-time index n for convenience. We assume, for mathematical convenience, that the observations are realizations of zero-mean Gaussian random processes, and that the noise process is statistically independent of the target process.

Each microphone signal may be passed through a discrete Fourier Transform (DFT) filterbank, leading to complex DFT coefficients $$Y_m(l, k) = \sum_{n=0}^{Q-1} y_m(lD - n) w_A(n) e^{-2\pi j k n/Q}$$

where l and k denote frame and frequency bin indices, respectively, Q is the frame length, D is the filterbank decimation factor, $w_A(n)$ is the analysis window function, and $j = \sqrt{-1}$ is the imaginary unit. Other filterbank structures are possible, for example non-uniform filterbanks.

We employ the standard assumption that DFT coefficients are independent across frame and frequency index, which allows us to process each DFT coefficient independently. Thus, without loss of generality, for a given frequency index k, we can collect the DFT coefficients of frame l for each microphone in a vector $Y(l, k) \in \mathbb{C}^M$ ($\mathbb{C}^M$ denotes an M-dimensional complex space) as $$Y(l, k) \triangleq [Y_1(l, k) \ldots Y_M(l, k)]^T$$

Similar equations describe the target vector $X(l, k) \in \mathbb{C}^M$ and the noise vector $V(l,k) \in \mathbb{C}^M$.

We model the target signal as a point source impinging on the array. Let $d(l,k) = [d_1(l,k) \ldots d_M(l,k)]^T$ denote the (complex-valued) propagation vector whose elements $d_m$ represent the respective acoustic transfer function from the source to the m'th microphone, evaluated at frequency index k. Then, $X(l,k)$ may be written as, $X(l,k) = x(l,k)d(l,k)$, where $x(l,k)$ is the clean target DFT coefficient with frame index l at the frequency index in question.

Now, the correlation matrix $\Phi_{YY}(l,k)$ of the noisy signal $Y(l, k)$ is defined as the average $E[Y(l, k)Y^H(l,k)]$ where the superscript H denotes Hermitian transposition (conjugate transposed). By assuming independence of target and noise, $\Phi_{YY}(l,k)$ can be written as the sum of the noise and target covariance matrices, $\Phi_{XX}(l,k)$ and $\Phi_{VV}(l,k)$, respectively. That is, $$\Phi_{YY}(l, k) =$$
$$\Phi_{XX}(l, k) + \Phi_{VV}(l, k) = \phi_{xx}(l, k)d(l, k)d^H(l, k) + E[V(l, k)V^H(l, k)],$$

where $\phi_{XX}(l,k) = E[|x(l,k)|^2]$ is the power of the target signal.

Finally, let us assume the following model for the development of the noise covariance matrix across time, $$\Phi_{VV}(l,k) = c^2(l,k)\Phi_{VV}(l_0,k), l > l_0 \quad \text{(Eq. 1)}$$

where $c^2(l,k)$ is a time-varying real-valued scaling factor, and $\Phi_{VV}(l_0,k)$ is the noise covariance matrix estimated as an average over recent frame indices where the target was absent, ending at the most recent frame index $l_0$. Thus, the above equation represents the evolution of $\Phi_{VV}(l,k)$ when speech is present; the noise process does not need to be stationary, but the covariance structure must remain fixed up to a scalar multiplication.

Thus, this model can be seen as a relaxation of the methodology known from early single-channel noise reduction systems, where the noise power estimated in the most recent noise-only region is assumed to remain constant across time when speech is present.

The goal in this section is to derive an estimate of the noise covariance matrix $\Phi_{VV}(l,k) = c^2(l,k)\Phi_{VV}(l_0,k)$, $l > l_0$, that is, when speech is present. The general idea is to do this based on the output of a set of linearly independent target cancelling beamformers, sometimes referred to as a blocking matrix in GSC terminology [5] (FIG. 4), see also [6] (Chapter 5.9 and the references therein).

Consider any full-rank matrix $B(l,k) \in \mathbb{C}^{M \times N}$, with $N < M$, which satisfies $$B^H(l,k)d(l,k) = 0.$$

Obviously, many such matrices exist. Assume that $d(l,k)$ is known and normalized to unit length, and let $H(l,k) = I_M - d(l,k)d^H(l,k)$, where $I_M$ is the M-dimensional identity matrix. Then, it can be verified that one such matrix $B(l,k)$ is given by the first N columns of matrix H, that is $$H(l,k) = [B(l,k) h_{N+1}(l,k) \ldots h_M(l,k)] \quad \text{(Eq. 2)}$$

where $h_n$ is simply the n'th column in H.

Each column of matrix B can be considered a target-cancelling beamformer, because when applied to the noisy input vector $Y(l,k) \in \mathbb{C}^N$, the output $Z(l,k) \in \mathbb{C}^N$ is only noise related $$Z(l,k) = B^H(l,k) Y(l,k) = B^H(l,k) V(l,k). \quad \text{(Eq. 3)}$$

From the above equation the covariance matrix of $Z(l,k)$ is given by $$\Phi_{ZZ}(l,k) = E[Z(l,k) Z^H(l,k)] = B^H(l,k) \Phi_{VV}(l,k) B(l,k), l > l_0. \quad \text{(Eq. 4)}$$

Inserting Eq. 1 in Eq. 4 we find $$\Phi_{ZZ}(l,k) = c^2(l,k) B^H(l,k) \Phi_{VV}(l_0,k) B(l,k), l > l_0. \quad \text{(Eq. 5)}$$

For a complex filterbank, it follows from the Gaussian assumption that vector $Z(l,k)$ obeys a zero-mean (complex, circular symmetric) Gaussian distribution, that is, $$f_{Z(l,k)}(Z(l,k)) + \frac{1}{\pi^N |\Phi_{ZZ}(l,k)|} \exp(-Z^H(l,k) \Phi_{ZZ}^{-1}(l,k) Z(l,k))$$

where $|\cdot|$ denotes the matrix determinant. The matrix $\Phi_{ZZ}$ is invertible when $\Phi_{VV}$ is invertible (see Eq. 5) which is usually the case.

Thus the likelihood function $\mathcal{L}$ can be written as $$\mathcal{L} = \log f_{Z(l,k)}(Z(l,k)) =$$
$$-N \log \pi - N \log c^2(l,k) - \log |B^H(l,k) \Phi_{VV}(l_0,k) B(l,k)| -$$
$$c^2(l,k) Z^H(l,k) [B^H(l,k) \Phi_{VV}(l_0,k) B(l,k)]^{-1} Z(l,k).$$

Maximizing $\mathcal{L}$ with respect to the unknown scaling factor $c^2(l,k)$ leads to the maximum likelihood estimate $$c_{ML}^2(l,k) = \frac{1}{N} Z^H(l,k) \Phi_{ZZ}^{-1}(l_0,k) Z(l,k) = \quad \text{(Eq. 6)}$$
$$\frac{1}{N} Z^H(l,k) [B^H(l,k) \Phi_{VV}(l_0,k) B(l,k)]^{-1} Z(l,k)$$

Note that Equation 6 devices two different ways of estimating the scaling factor $c_{ML}^2$, by either using an explicit estimate of the covariance matrix $\Phi_{ZZ}(l_0,k)$ of the target cancelled signals $Z(l,k)$, or using an estimate of the covariance matrix $\Phi_{VV}(l_0,k)$.

We further note that $c_{ML}^2(l,k) \geq 0$ such that the noise covariance estimate $$\hat{\Phi}_{VV}(l,k) = c_{ML}^2(l,k) \hat{\Phi}_{VV}(l_0,k), l > l_0 \quad \text{(Eq. 7)}$$

remains positive definite as long as the noise covariance estimate $\hat{\Phi}_{VV}(l_0,k)$ obtained in the most recent time frames with target absence is positive definite.

Finally, let $w(l,k) \in \mathbb{C}^M$ denote the linear beamformer filter such that the beamformer output is given by $Y_w(l,k) = w^H(l,k) Y(l,k)$. Then an estimate of the power of the noise in the beamformer output is given by $$\phi_{VV}(l,k) = w^H(l,k) \hat{\Phi}_{VV}(l,k) w(l,k) \quad \text{(Eq. 8)}$$

In an equivalent manner, an estimate of the power of the noise in the beamformer output may be given by $$\phi_{VV}(l,k) = c_{ML}^2(l,k) \phi_{VV0}(l,k),$$

where $\phi_{VV0}(l,k)$ is an initial estimate of the beamformer output noise which may be estimated as an average of the beamformer output power $|Y_w(l,k)|^2$ over recent frame indices where the target was absent, ending at the most recent frame index $l_0$. This may be done explicitly from the beamformer output signal, or via the estimated noise covariance matrix as shown in Eq. (8).

In an embodiment, this noise power estimate may be used to derive a post-filter gain value. By comparing the magnitude of the beamformer output signal to the noise power, a signal-to-noise ratio may be derived, which may be used for computing a gain value. In other embodiments where voice recognition is employed on the beamformer output signal, the voice recognition may benefit from being based on both a beamformed signal and a noise PSD estimate.

EXAMPLE EMBODIMENTS

Figure 2:
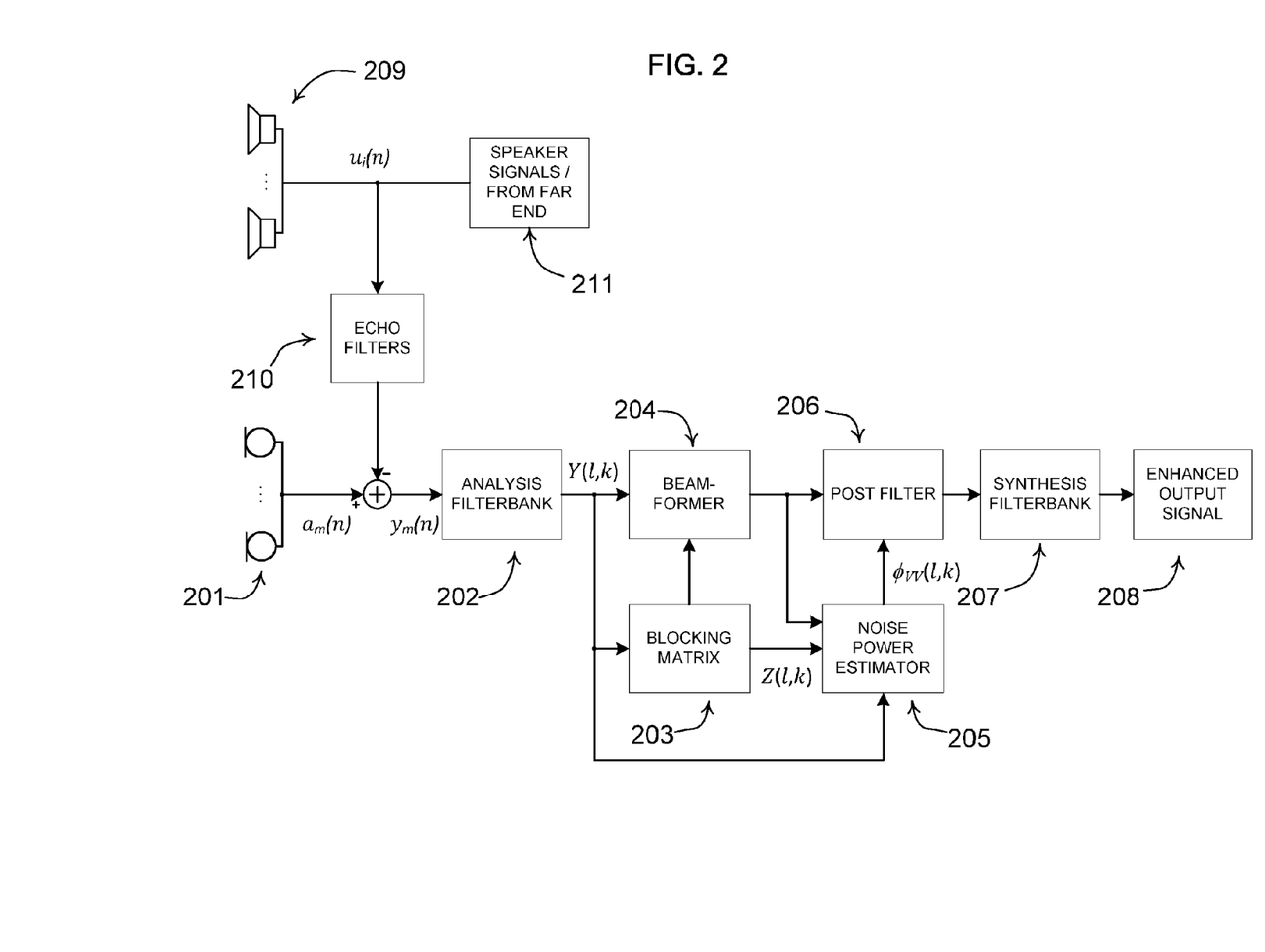
FIG. 2 shows a combined echo cancellation system, beamformer and noise reduction and residual echo reduction system based on noise and residual echo power estimation in an embodiment according to the invention.
Figure 3:
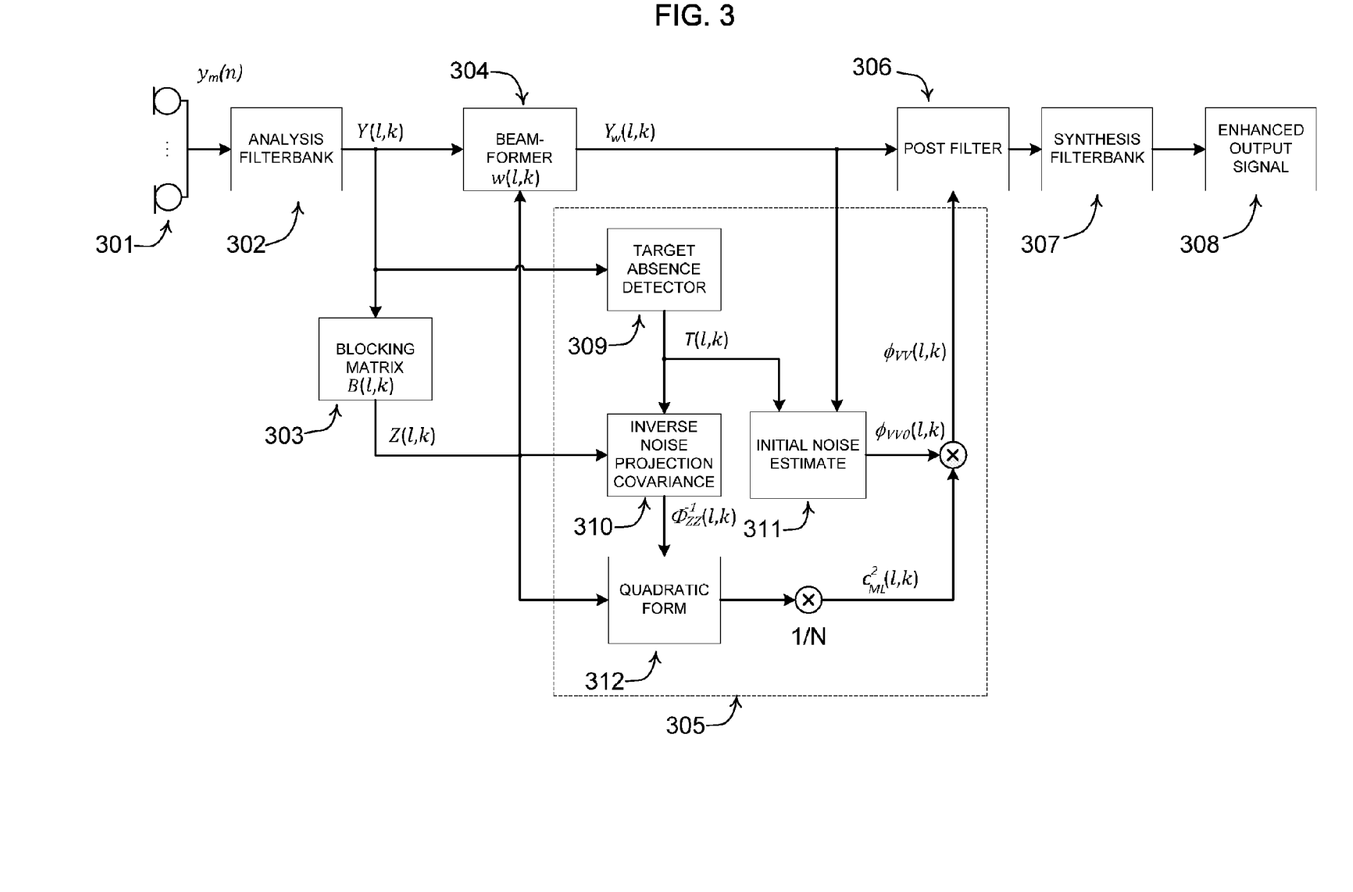
FIG. 3 shows a beamformer and noise reduction system, with a blocking matrix, a target absence detector, and a quadratic form for noise estimation refinement based on the inverse target-cancelled covariance matrix, in an embodiment according to the invention.
Figure 4:
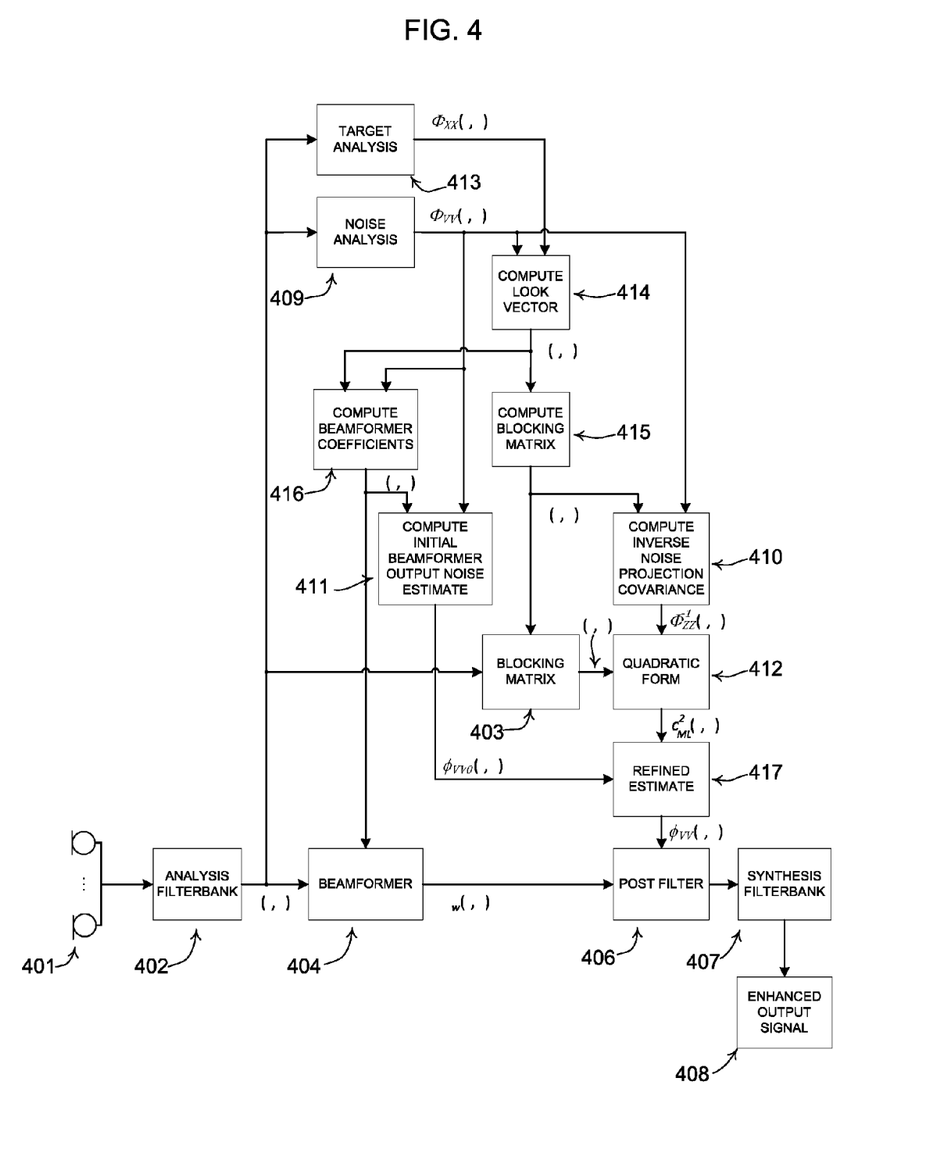
FIG. 4 shows a beamformer and noise reduction system with adaptive target direction and noise power estimation in an embodiment according to the invention.

Thus, a method for audio signal processing by a combination of beamforming and adaptive post-filtering of acoustic signals received from a microphone array may comprise some or all of the steps of:

receiving M communication signals in frequency subbands where M is at least two;
in each subband processing the respective M subband communication signals with a blocking matrix (203,303, 403) of M rows and N linearly independent columns, where N>=1 and N<M, to obtain N target cancelled signals;
in each subband, processing the respective M subband communication signals and the N target cancelled signals with a set of beamformer coefficients (204,304,404) to obtain a beamformer output signal;
processing the M communication signals with a target absence detector (309) to obtain a target absence signal in each subband;
using the target absence signal to obtain an inverse target-cancelled covariance matrix of order N (310,410) in each subband;
processing the N target-cancelled signals in each subband with the inverse target-cancelled covariance matrix in a quadratic form (312, 412) to yield a real-valued noise correction factor in each subband;
using the target absence signal to obtain an initial estimate (311, 411) of the noise power in the beamformer output signal averaged over recent frames with target absence in each subband;
multiplying the initial noise estimate with the noise correction factor to obtain a refined estimate (417) of the power of the beamformer output noise signal component in each subband;
processing the refined estimate of the power of the beamformer output noise signal component with the magnitude of the beamformer output to obtain a postfilter gain value in each subband;
processing the beamformer output signal with the postfilter gain value (206,306,406) to obtain a postfilter output signal in each subband;
processing the postfilter output subband signals through a synthesis filterbank (207,307,407) to obtain an enhanced beamformed output signal where the target signal is enhanced by attenuation of noise signal components.

It is an advantage that the postfilter gain value is derived from an accurate estimate of the power of the noise component of the beamformer output. This is achieved in that the noise power is derived from a combination of N target-cancelled signals each of which are obtained from independent spatial filters (i.e. a blocking matrix) that cancel the desired target signal, and are therefore affected very little by it. This allows estimation of noise levels even in the presence of a target signal.

By use of a quadratic form with matrix coefficients that are derived as the inverse correlation matrix of the N blocking matrix signals the estimate becomes optimal in a maximum likelihood sense. Previous methods for estimation of beamformer output noise using spatial filters [1] (FIG. 2, block 15), [2] (FIG. 2), [7] (FIG. 2), [10] (FIG. 1), [11] (FIG. 1), [12] (FIG. 1) have not had this property and are therefore less accurate.

A traditional method for echo cancellation comprises an adaptive estimate of the transfer functions from each loudspeaker signal to each of the microphone signals, and to subtract the predicted loudspeaker signal component from each of the detected microphone signals. Because certain components of the echo signals may not in practice be attenuated well enough, in particular in connection with long room impulse responses, it is an advantage of the disclosed method that the residual echo signal associated with the late reverberation is estimated as ambient noise and in an embodiment is subsequently attenuated by an adaptive post filter.

In other embodiments it is an advantage that a late reverberation signal and noise is estimated accurately because it may allow an increased recognition rate of a voice control system that is being passed an adaptively beamformed signal as well as an estimate of the noise PSD in said signal.

In an embodiment, the target enhancing beamformer is an MVDR beamformer [3] (Chapter 2.3 Eq. 2.25) implemented by means of a GSC structure, see e.g. [3] (Chapter 5.2, FIG. 5.1). The proposed method is advantageous in that it shares many of the same computational steps with the MVDR beamformer implemented in the GSC form. This can be realized by considering an MVDR beamformer which may be implemented by the equation $y_{MVDR}(l,k) = w_0^H(l,k)Y(l,k) - q_{MVDR}^H(l,k)Z(l,k)$, where $Y(l,k)$ is the M-dimensional subband signal vector of channel k, and $w_0(l,k)$ is an M-dimensional complex vector representing a beamformer that obeys $w_0^H(l,k)d(l,k) = d_0(l,k)$ where $d(l,k)$ is a complex vector of order M, called the look vector. This vector represents the relative transfer function for a target signal to the M microphones in the k'th subband, and $d_0(l,k)$ is a particular predetermined element of the look vector sometimes referred to as the reference microphone. The N-dimensional complex vector $q_{MVDR}(l,k)$ holds the MVDR coefficients, where N is the number of target cancelling beamformers, $1 \leq N < M$, represented by a blocking matrix $B(l,k)$, and $Z(l,k) = B^H(l)Y(l,k)$ is a vector of the N target-cancelled signals. A method for determining $q_{MVDR}(l,k)$ is to use a closed form expression $q_{MVDR}(l,k) = \Phi_{ZZ}^{-1}(l,k)\Phi_{zy_0}(l,k)$ where $\Phi_{zy_0}(l,k) = E[zy^*_0]$.

It should be stressed that the operator $E[\cdot]$ in this disclosure is used in the meaning "average", which is meant to be interpreted either as a statistical expectation, or as an empirical average over a batch of samples, or as a low-pass filter of recent samples. A common averaging formula is to use a first order IIR low pass filter corresponding to the z-transform $H(z) = \lambda/(1-(1-\lambda)z^{-1})$, where $\lambda$ is a parameter satisfying $0 \leq \lambda(l) \leq 1$ defining the time constant $\tau(l)$ of the averaging process where the relationship between the time constant $\tau(l)$ and $\lambda(l)$ may be computed as $$\lambda(l) = 1 - \exp\frac{-1}{f_s * \tau(l)}$$

where $f_s$ is the frame rate. In an embodiment, the average $E[Z(l)Z^H(l)]$ is implemented as the recursive update equation $$\Phi_{ZZ}(l,k) = (Z(l,k)Z^H(l,k) - \Phi_{ZZ}(l-1,k))\lambda(l,k) + \Phi_{ZZ}(l-1,k) \quad \text{(Eq. 9)}$$

In an embodiment the coefficient $\lambda(l,k)$ is made time variant in order to be able to control over which time frame instances, or with what weighting of individual time frame instances, the average should be computed. Preferably, the averaging is performed over frames with target absence, as indicated by a target absence signal $T(l,k)$ in each subband. In an embodiment, the signal $T(l,k)$ attains a value 1 when target is absent and a predetermined value of e close or equal to 0, otherwise, and the coefficient $\lambda(l,k)$ is made to depend on target absence by the relation $\lambda(l,k) = T(l,k)\lambda_0(k)$, where $\lambda_0(k)$ reflects a predetermined averaging time constant for each subband. In a further embodiment the signal $T(l,k)$ is derived from the output of a VAD (voice activity detector).

Since both the MVDR coefficient calculation for target enhancing beamformer coefficients and the noise estimation method benefit from averaging over frames dominated by undesired signals, such as noise signals, microphone noise, and residual echo signals, the N'th order inverse matrix $\Phi_{ZZ}^{-1}(l,k)$ in each subband may be reused, which is an advantage of the disclosed method.

In some communication situations the acoustical direction of incidence of the target signal is not predetermined. In an embodiment it is an advantage in such acoustical setups to adaptively estimate the blocking matrix. In a further embodiment this may be done by adaptively estimating a look vector $d(l,k)$ in each subband by analysis of a covariance matrix estimated during frames with target signal presence as indicated by a target presence signal, derived, e.g., from a voice activity detector. In an embodiment said analysis is performed by means of a generalized eigenvector analysis of the M'th order covariance matrix $\Phi_{VV}(l_0,k)$ of microphone signals estimated during recent frames of target absence and the M'th order covariance matrix of microphone signals estimated during recent frames of target presence $\Phi_{YY}(l_P,k)$, where $l_P$ may represent latest frame index with target presence. Said analysis may be performed by deriving the eigenvector corresponding to the largest eigenvalue of the generalized eigenvalue problem $\Phi_{YY}(l_P,k)v = \lambda\Phi_{VV}(l_0,k)v$, where $v \in \mathbb{C}^M$ is the eigenvector, and $\lambda$ is a real eigenvalue,—this may be done by eigenvector analysis of the matrix $\Phi_{VV}^{-1}(l_0,k)\Phi_{YY}(l_P,k)$. If such eigenvector is denoted by $v_1(l,k)$, it can be shown that the MVDR coefficient vector is proportional to this vector, as $w(l,k) = v_1(l,k)d^*_0(l,k)/(d^H(l,k)v_1(l,k))$, and the look vector $d(l,k) = \Phi_{VV}(l_0,k)v_1(l,k)$. This generalized eigenvector method thus has the advantage of providing both the look vector estimate that may be used for adaptively calculating a blocking matrix, as well as an MVDR beamformer for enhancing the target signal.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/ or groups thereof. It will also be understood that when an element is referred to as being "connected" or "coupled" to another element, it can be directly connected or coupled to the other element or intervening elements may be present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The invention will be explained more fully below in connection with a preferred embodiment and with reference to the drawings in which.

The figures are schematic and simplified for clarity, and they just show details which are essential to the understanding of the disclosure, while other details are left out. Throughout, the same reference numerals are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

In the following description, reference is made to the accompanying figures, which illustrate how the invention may be practiced.

Figure 1:
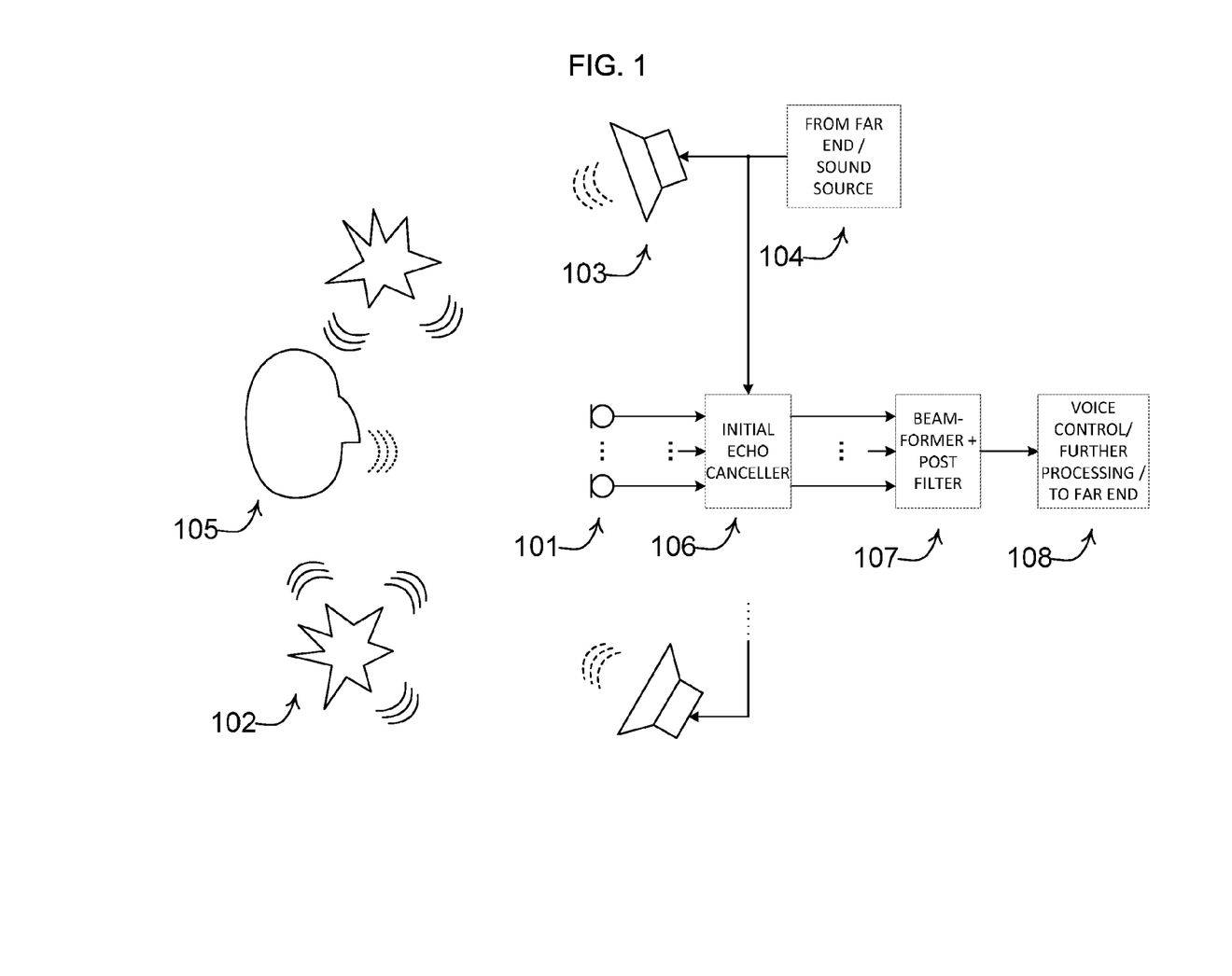
FIG. 1 shows a user in a personal communication or voice control scenario, with an echo cancellation and noise reduction system in an embodiment according to the invention.

FIG. 1 shows a schematic view of a user in a communication situation, which may represent a hands-free telephone situation in e.g. a car, a teleconference, or a voice control situation, where a device is performing residual echo and noise reduction. A user 105 is situated with ambient noise sources 102 where one or more loudspeakers 103 reproduce an acoustical signal from e.g. a far-end speaker 104. The loudspeaker(s) could also be reproducing a signal from other sound sources, such as radio, music source, sound tracks, karaoke system, etc. The user may produce a target speech signal which it is the aim of the device to detect with high quality. An array of M transducers 101 detect an acoustical mixture signal which may be composed of a superposition of the target speech signal, echo signals from the loudspeakers, ambient noise, and transducer noise. The microphone array signals and the loudspeaker signals are passed to an initial echo cancelling system 106, which adaptively estimates the transfer function from one or more of the loudspeakers to one or more of the microphones, and subtracts a signal generated by filtering one or more of the loudspeaker signals according to one or more of the estimated transfer functions to obtain M initial echo cancelled communication signals. These communication signals are passed to a beamformer 107 which implements a spatial filter to enhance the target speech signal and attenuate noise and residual echo signals, and may in some embodiments also be processed by a post filter 107 to further reduce noise and residual echo signals by means of a time-frequency dependent gain function derived from a time-frequency dependent estimate of the signal-to-disturbance ratio, which is derived from a time-frequency dependent noise estimate. In a voice control situation an enhanced signal, which may or may not have been post-filtered, is passed to a subsequent system 108 for speech recognition. In a teleconference system, an enhanced signal is transmitted back to the far end. In other embodiments a representation of the time-frequency dependent noise power estimate is passed to the subsequent voice recognition system in addition to an enhanced signal.

FIG. 2 shows how the disclosed noise power estimator 205 may be embedded in a communication system with echo cancelling, beamforming, and noise reduction. A loudspeaker signal in one or more audio channels is available in digital form from an audio signal source 211 and is reproduced as an acoustical signal by one or more loudspeakers. A set of echo filters 210 adapted to match the acoustical echo transfer functions, filter the loudspeaker signals to obtain an echo signal estimate for each of the M microphones, M>1. The echo signal estimate is subtracted from the microphone signals to obtain M communication signals $y_m(n)$, $m=1 \ldots M$ where n is a discrete sample time index. In an embodiment an analysis filterbank (not shown) processes each loudspeaker signal and the acoustical echo transfer functions are estimated in one or more subbands and the subsequent subtraction of the estimated echo signal at each microphone signal is performed in the subband domain. A filterbank 202 produces a time-frequency representation of each communication signal, which in an embodiment may be performed as a short time Fourier transform (STFT) to obtain coefficients $Y_m(l,k) = \sum_{n=0}^{Q-1} y_m(lD-n) w_A(n) e^{-2\pi j k n/Q}$, where l and k denote frame and frequency bin indices, and predetermined parameters Q, D and $w_A(n)$ are frame length, decimation factor (hop size), and analysis window. For simplicity of notation we collect all coefficients for M communication signals in the vector $$Y(l, k) \triangleq [Y_1(l, k) \ldots Y_M(l, k)]^T.$$

A blocking matrix B(l,k) 203 of dimensions M rows by N columns, where $1 \leq N < M$ is applied by the operation $Z(l,k) = B^H(l,k) Y(l,k)$. The blocking matrix is designed to attenuate the target signal, while at the same time having a full rank, i.e. the N columns are linearly independent. The blocking matrix may in an embodiment be predetermined. In a further embodiment the blocking matrix can be adaptive, in order to track a target that changes position. An embodiment may use Eq. (2) for calculating a blocking matrix. A beamformer 204 processes the M communication signals to obtain an enhanced beamformed signal by means of a set of beamformer weights w(l,k) so that $Y_w(l,k) = w^H(l,k) Y(l,k)$. The beamformer may in some embodiments have predetermined weights. In other embodiments the beamformer may be adaptive. A common method is a Generalized Sidelobe Canceller (GSC) structure where the blocking matrix signal Z(l,k) is adaptively filtered with coefficients q(l,k) and subtracted from a predetermined reference beamformer $w_0(k)$, to minimize the beamformer output, e.g. $w(l,k) = w_0(k) - B(l,k) q(l,k)$. The noise power estimator 205 provides an estimate $\hat{\phi}_{VV}(l,k)$ of the power of the noise component of the enhanced beamformed signal, and is detailed further, in FIG. 3. The noise power estimate is used by the post filter 206 to yield a time-frequency dependent gain g(l,k) which is applied to the enhanced beamformed signal. The gain may be derived by means of a gain function, e.g. as function of the estimated signal-to-noise-ratio (SNR) value $\xi(l,k)$, as $g(l,k)=G(\xi(l,k))$, which in some embodiments can be a bounded Wiener filter, i.e.

$$G(\xi) = \max\left(\frac{\xi}{\xi+1}, g_{min}\right),$$

where $g_{min}$ is a predetermined lower bound on the applied gain to reduce audible artifacts. In some embodiments, other functions may contribute to or process the gain value, such as equalization, dynamic compression, feedback control, or a volume control. In an embodiment, the gain function is a bounded spectral subtraction rule, i.e., $$G(\xi) = \max\left(\sqrt{\frac{\xi}{\xi+1}}, g_{min}\right).$$

The estimated SNR value may in a further embodiment be derived from a decision-directed approach, see e.g. Ephraim and Malah [13] (see Eqs. 48-52), such that $$\xi(l,k) = \alpha \frac{\hat{A}^2(l-1,k)}{\hat{\phi}_{VV}(l,k)} + (1-\alpha)\max\left(0, \frac{|Y(l,k)|^2}{\hat{\phi}_{VV}(l,k)} - 1\right),$$

where $\alpha$ is a predetermined control parameter usually set to a value 0.94 to 0.98, and $\hat{A}^2(l,k)$ is an estimate of the squared magnitude of the target signal from the previous frame, following $\hat{A}^2(l,k)=|Y_w(l,k)g(l,k)|^2$. The postfilter outputs a time-frequency weighted signal $\bar{X}(l,k)=Y_w(l,k)g(l,k)$ to a synthesis filterbank 207 which produces an enhanced time domain signal where the target signal is preserved and noise and echo signals are attenuated. The synthesis filterbank may apply an overlap-sum scheme so that an enhanced output signal $\tilde{x}(n)$ is obtained, according to $\tilde{x}(n)=\Sigma_{l=-\infty}^{\infty}[w_s(n')\Sigma_{k=0}^{Q-1}e^{2\pi jkn'/Q}\bar{X}(l,k)]_{n'=lD-n}$, where $w_s(n)$ is a synthesis window, e.g. a square root raised cosine window. The enhanced signal may in some embodiments be used for transmission to the remote part. In other embodiments, an automated speech recognition system or a voice control system may receive the signal for processing.

FIG. 3 shows further details of a noise power estimator 205 according to an embodiment of the invention. In the diagram, blocks 301-308 correspond to blocks 201-208 in FIG. 2, and block 309-312 represent details of the noise power estimator 205. A target absence detector 309 processes the subband communication signals Y(l, k) to obtain a target absence indicator signal T(l,k), which in an embodiment may be a binary indicator derived from a comparison of a short term averaged power $\langle|Y(l,k)|^2\rangle$ to a noise floor power estimator, such as R. Martin [4] (Section II-III), operating on the reference microphone signal in each subband, so that target absence is assumed when the ratio of the short term averaged power to the noise floor power estimate does not exceed a predetermined threshold value, for example 8 dB. The inverse target-cancelled covariance matrix $\Phi_{ZZ}^{-1}(l,k)$ may in an embodiment be computed in 310 from the target-cancelled covariance matrix $\Phi_{ZZ}(l,k)$ by means of an averaging process $\Phi_{ZZ}(l,k)=(Z(l,k)Z^H(l,k)-\Phi_{ZZ}(l-1,k))\lambda(l,k)+\Phi_{ZZ}(l-1,k)$. In an embodiment, the target absence signal T(l,k) attains the value 1 when target is absent and 0 otherwise, so by letting $\lambda(l,k)=T(l,k)\lambda_0$, the covariance may be computed as an average over recent frames with target absence. The predetermined parameter $\lambda_0$ may in an example embodiment be set to correspond to a predetermined time constant of 0.1 seconds. An initial noise power estimate $\phi_{VV0}(l,k)$ is computed in 311. In this computation it is important to use the same target absence signal and the same averaging process as used in 310, which in an embodiment corresponds to the averaging process $\phi_{VV0}(l,k)=(Y_W(l,k)Y_W^H(l,k)-\phi_{VV0}(l-1,k))\lambda(l,k)+\phi_{VV0}(l-1,k)$, and using the same signal $\lambda(l,k)$. A quadratic form is used in 312 to compute the correction factor $$c_{ML}^2(l,k) = \frac{1}{N}Z^H(l,k)\Phi_{ZZ}^{-1}(l,k)Z(l)$$

where N equals the number of columns in the blocking matrix, and the correction factor is used together with the initial noise power estimate to yield the refined noise power estimate $\phi_{VV}(l,k)=c_{ML}^2(l,k)\phi_{VV0}(l,k)$. The processing in blocks 306-308 may be similar to the processing in blocks 206-208 of FIG. 2.

FIG. 4 shows how the noise power estimation may be embedded in a system for adaptive beamforming and noise reduction involving an adaptive target direction. The blocks 401, 402, 403, 404 correspond to the blocks 201, 202, 203, and 204, respectively, in FIG. 2. The noise analysis 409 may contain a target absence detection corresponding to 309 to obtain a target absence signal T(l, k) with averaging in order to obtain an estimate of an M'th order noise covariance matrix $\Phi_{VV}(l,k)$ of the communication signals. In an embodiment, the averaging is performed as a recursive filter $\Phi_{VV}(l,k)=(Y(l,k)Y^H(l,k)-\Phi_{VV}(l-1,k))\lambda(l,k)+\Phi_{VV}(l-1,k)$ where $\lambda(l,k)=T(l,k)\lambda_0$, and $\lambda_0$ is a predetermined parameter which may in an example embodiment be set to correspond to a time constant of 0.1 seconds. A target covariance matrix is obtained from the target analysis 413, and may in an embodiment comprise target presence detection to obtain a target presence signal S(l,k) which may be in form of a VAD (voice activity detector), such that S(l,k)=1 if target is present and 0 otherwise, and may in an embodiment be used with a recursive averaging process $\Phi_{XX}(l,k)=(Y(l,k)Y^H(l,k)-\Phi_{XX}(l-1,k))S(l,k)\lambda_0+\Phi_{XX}(l-1,k)$ to obtain an average of target dominated frames. A look vector estimate d(l, k) is obtained in 414 by analysis of the noise and target covariance matrices,—this look vector analysis may in an embodiment be performed by using a single column of the matrix difference $\Phi_{XX}(l,k)-\Phi_{VV}(l,k)$. In a further embodiment the look vector is estimated by using the eigenvector corresponding to the largest eigenvalue of said difference matrix. An adapted blocking matrix B(l,k) is obtained in 415, which may be computed according to Eq. (2) based on the estimated look vector. From the noise covariance estimate and the look vector, an embodiment may derive a set of beamformer coefficients 416, which may be a set of MVDR coefficients according to $w(l,k)=\Phi_{VV}^{-1}d(l,k)d^*_0(l,k)/(d^H(l,k)\Phi_{VV}^{-1}d(l,k))$. An initial beamformer noise estimate 411 may be derived as $\phi_{VV0}(l,k)=w^H(l,k)\Phi_{VV}(l,k)w(l,k)$. Likewise, an inverse target-cancelled covariance matrix may be computed in 410 as $\Phi_{ZZ}^{-1}(l,k)=(B^H(l,k)\Phi_{VV}(l,k)B(l,k))^{-1}$. A correction factor $c_{ML}^2(l,k)$ is computed in 412 from a quadratic form using $$c_{ML}^2(l,k) = \frac{1}{N} Z^H(l,k) \Phi_{ZZ}^{-1}(l,k) Z(l).$$

The refined noise power estimate is found in 417 as $\phi_{VV}(l,k) = c_{ML}^2(l,k)\phi_{VV0}(l,k)$. The processing in blocks 406-408 may be similar to the processing in blocks 206-208 of FIG. 2.

Figure 5:
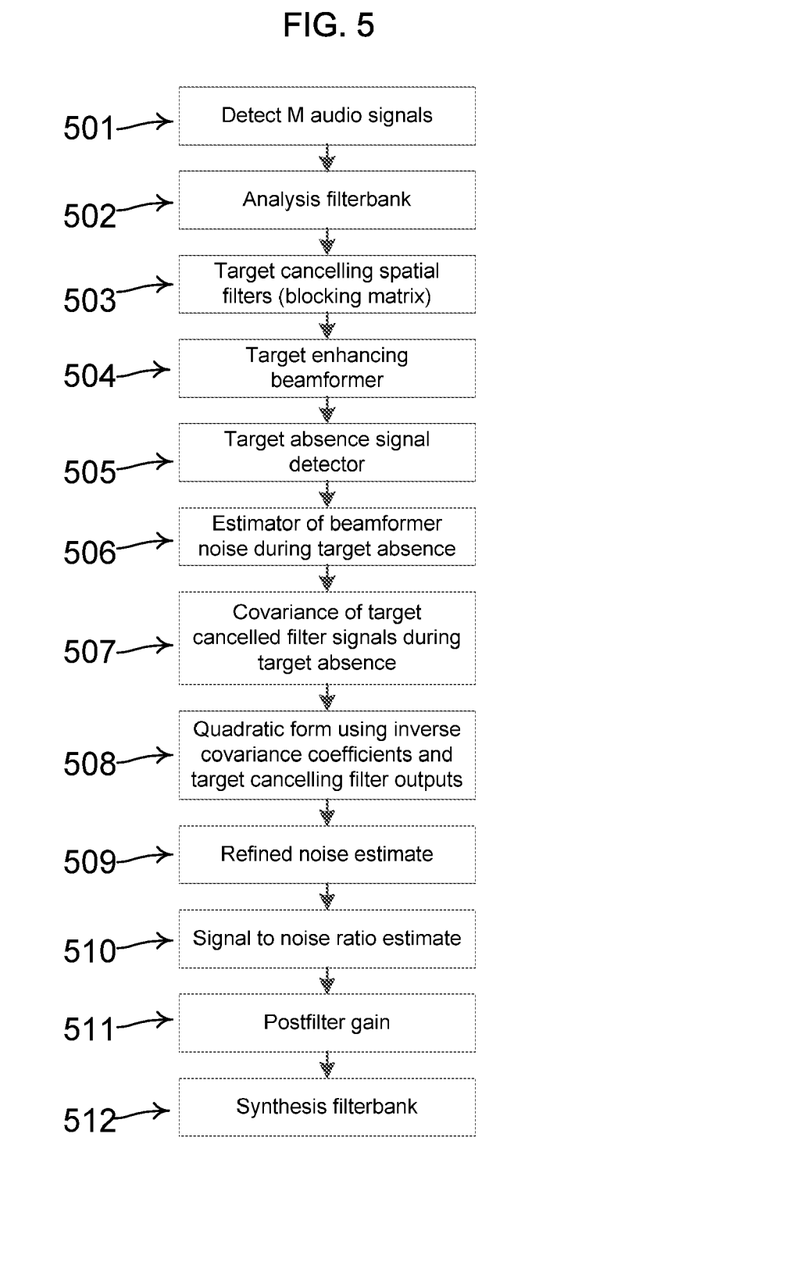
FIG. 5 shows computational steps in a beamformer and noise reduction system in an embodiment according to the invention.

FIG. 5 shows computations for a noise reduction and beamforming method according to an embodiment of the invention. An embodiment according to the invention may comprise the steps described here explicitly or implicitly by combining multiple steps, and the particular order of the steps is not important. Audio signals in M channels, where M≥2 are detected by means of a sensor array 501, and an analysis filterbank 502 processes signals into frequency dependent subbands. A set of N target cancelling filters 503, where 1≤N<M, process the audio signals to obtain N target-cancelled signals. In some embodiments the target cancelling filters are performed in the time domain, in others the filtering is performed in the frequency domain provided by the filterbanks. A target enhancing beamformer 504 may process the M audio signals into a target enhanced signal. A target absence signal detector 505 provides a signal for use of an estimator 506 providing an initial estimate of target enhancing beamformer output noise power during target absence. Using the same target absence signal, the covariance of the N-dimensional target-cancelled is obtained in one or more subbands, 507. In some embodiments the target-cancelled covariance matrix may be regularized by adding a small value on the diagonal before matrix inversion, in order to obtain an estimated inverse target-cancelled covariance matrix which is used as coefficients of a quadratic form of order N, 508 of the target-cancelled subband signals. The result of the quadratic form is used as a correction scaling signal to be multiplied with the initial estimate of target enhancing beamformer output noise power to obtain a refined noise estimate of target enhancing beamformer output noise power, 509. The refined noise estimate forms the basis for computation of an estimate of the signal to noise ratio 510, which may in an example embodiment be used with classical methods such as Ephraim & Malah [13] (Eqs. 48-52) to obtain a post filter gain value in each subband, to be applied to the target enhancing beamformer 511 to obtain a post filtered enhanced target signal. A synthesis filterbank 512 is used to obtain a time domain signal where the target signal is maintained and noise sources and residual echo signals are attenuated.

The invention is defined by the features of the independent claims. Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims. For example, in a hearing aid, further processing steps may be required, for example steps for hearing loss compensation.

REFERENCES

[1] EP 2 026 597 B1, Noise reduction by combined beamforming and post-filtering.
[2] U.S. Pat. No. 8,204,263 B2, Method of estimating a weighting function of audio signals in a hearing aid.
[3] M. Brandstein and D. Ward, "Microphone Arrays", Springer 2001.
[4] R. Martin, "Noise Power Spectral Density Estimation Based on Optimal Smoothing and Minimum Statistics", IEEE Trans, on Speech and Audio Processing, vol. 9, no. 5, 2001.
[5] L. J. Griffiths and C. W. Jim, "An Alternative Approach to Linearly Constrained Adaptive Beamforming," IEEE Trans. Antennas Propagat, vol. 30, no. 1, pp. 27-34, January 1982.
[6] S. Haykin, Adaptive Filter Theory, Prentice Hall, Third edition, 1996
[7] K. U. Simmer, J. Bitzer, and C. Marro, "Post-Filtering Techniques," in Microphone Arrays—Signal Processing Techniques and Applications, M. Brandstein and D. Ward, Eds. 2001, Springer Verlag.
[8] E. Warsitz, "Blind Acoustic Beamforming Based on Generalized Eigenvalue Decomposition", IEEE Trans. Audio Speech and Language Processing, Vol. 15, no 5, 2007.
[9] T. Wolff and M. Buck, "Spatial maximum a posteriori post-filtering for arbitrary beamforming," in Handsfree Speech Communication and Microphone Arrays (HSCMA), 2008.
[10] R. Zelinski, "A Microphone Array With Adaptive Post-Filtering for Noise Reduction in Reverberant Rooms," in Proc. IEEE International Conference on Acoustics, Speech and Signal Processing, 1988, vol. 5, pp. 2578-2581.
[11] I. A. McCowan and H. Bourlard, "Microphone Array Post-Filter Based on Noise Field Coherence," IEEE Trans. Speech and Audio Processing, vol. 11, no. 6, pp. 709-716, 2003.
[12] S. Lefkimmiatis and P. Maragos, "Optimum post-filter estimation for noise reduction in multichannel speech processing," in Proc. 14th European Signal Processing Conference, 2006.
[13] Y. Ephraim and D. Malah, "Speech enhancement using a minimum-mean square error short-time spectral amplitude estimator," Acoustics, Speech and Signal Processing, IEEE Transactions on, vol. 32, no. 6, pp. 1109-1121, December 1984.

The invention claimed is:

1. A method for audio signal processing, the method comprising:
    in one or more frequency subbands, receiving M communication signals in time frames and comprising a target signal and a noise signal, where M≥2;
    in each subband, processing the M subband communication signals with a set of beamformer coefficients to obtain a beamformer output signal;
    in each subband, processing the M subband communication signals in N linearly independent target-cancelling beamformers, where 1≤N<M, to obtain N target-cancelled signals wherein the target signal is suppressed relative to the noise signal;
    processing the communication signals with a target absence detector to obtain a target absence signal;
    in each subband, estimating a covariance matrix of order N of the target-cancelled signals as an average, where individual time frames are weighted as a function of the target absence signal;
    in each subband, estimating an inverse target-cancelled covariance matrix of order N;
    in each subband, determining a real-valued scaling factor in dependence of the inverse target-cancelled covariance matrix and the N target-cancelled signals;
    in each subband, determining an initial estimate of the noise power in the beamformer output signal as an average, where individual time frames are weighted using said function of the target absence signal;

in each subband, multiplying the initial noise estimate with the scaling factor to obtain a refined estimate of the noise power in the beamformer output signal.

2. A method according to claim 1 where
determining the initial estimate of the noise power in the beamformer output signal comprises determining the initial estimate of the noise power in the beamformer output signal in dependence of the set of beamformer coefficients.

3. A method according to claim 1 where
in one or more subbands, the beamformer output signal is generated using at least one adaptive filter derived from the inverse target-cancelled covariance matrix and the N target-cancelled signals.

4. A method according to claim 1 where
in one or more subbands, the N linearly independent target cancelling beamformers are computed adaptively from analysis of the M communication signals.

5. A method according to claim 4 where
in one or more subbands, the N linearly independent target cancelling beamformers are determined adaptively from a look vector derived from an analysis of an M'th order mixture covariance matrix estimated during recent frames of target presence, and an M'th order noise covariance matrix of communication signals estimated during recent frames of target absence.

6. A method according to claim 5 where
in one or more subbands, said analysis comprises an eigenvector analysis of a difference between said mixture covariance matrix and said noise covariance matrix and selecting the eigenvector associated with the largest eigenvalue as the look vector.

7. A method according to claim 5 where
in one or more subbands, said analysis comprises a generalized eigenvector analysis of the inverse of said noise covariance estimate multiplied with said mixture covariance matrix and using the eigenvector associated with the largest eigenvalue to obtain the look vector.

8. A method according to claim 1 where
in each subband, the inverse target-cancelled covariance matrix is estimated by processing the N target cancelling signals by an outer product to obtain an outer product matrix of order N;
estimating a target-cancelled covariance matrix as an average of said outer product matrix, where individual time frames are weighted as a function of the target absence signal
inverting the target-cancelled covariance matrix to obtain the inverse target-cancelled covariance matrix.

9. A method according to claim 1 where said inverse target-cancelled covariance matrix is computed by
in each subband, processing the M communication signals by an outer product to obtain an outer product signal matrix of order M;
estimating a noise covariance matrix of order M as an average of said outer product matrix, where individual time frames are weighted as a function of the target absence signal
in each subband, processing the noise covariance matrix with the blocking matrix to obtain a target-cancelled covariance matrix of order N;
in each subband, inverting the target-cancelled covariance matrix to obtain the inverse target-cancelled covariance matrix.

10. A method according to claim 1, further comprising
receiving an audio signal by means of a microphone array comprising M microphones, to obtain M microphone signals each comprising a target signal and a noise signal;
passing the M microphone signals through an analysis filterbank to obtain the M communication signals in one or more frequency subbands;
in each subband, determining a post-filter gain value in dependence on the refined estimate of the noise power in the beamformer output signal and the beamformer output signal;
in each subband, processing the beamformer output signal with the postfilter gain value to obtain a postfilter output signal;
combining the postfilter output signals of the subbands in a synthesis filterbank to obtain an enhanced beamformed output signal.

11. A method according to claim 1, further comprising
receiving L loudspeaker signals from L respective loudspeakers where $L \geq 1$,
receiving an audio signal by means of a microphone array comprising M microphones, to obtain M echo-contaminated microphone signals each comprising a target signal and a noise signal;
adaptively estimating filter weights for filtering each of the L loudspeaker signals to approximate each of the M echo-contaminated microphone signals;
subtracting each of the L filtered speaker signals from each of the M echo-contaminated microphone signals to obtain M echo-cancelled microphone signals.
in each subband, determining a post-filter gain value in dependence on the refined estimate of the noise power in the beamformer output signal and the beamformer output signal;
in each subband, processing the beamformer output signal with the postfilter gain value to obtain a postfilter output signal;
combining the postfilter output signals of the subbands in a synthesis filterbank to obtain an enhanced beamformed output signal.

12. A method according to claim 1 where the enhanced beamformed output signal is used as input to a voice control system.

13. A method according to claim 1 where the beamformer output signal and the refined estimate of the power of the beamformer output noise signal component are used as input to a voice control system.

14. An apparatus adapted to execute a method according to claim 1.

15. A hearing aid adapted to execute a method according to claim 1.

16. A method according to claim 2 where
in one or more subbands, the beamformer output signal is generated using at least one adaptive filter derived from the inverse target-cancelled covariance matrix and the N target-cancelled signals.

17. A method according to claim 2 where
in one or more subbands, the N linearly independent target cancelling beamformers are computed adaptively from analysis of the M communication signals.

18. A method according to claim 3 where
in one or more subbands, the N linearly independent target cancelling beamformers are computed adaptively from analysis of the M communication signals.

19. A method according to claim 2 where
in each subband, the inverse target-cancelled covariance matrix is estimated by processing the N target cancelling signals by an outer product to obtain an outer product matrix of order N;
estimating a target-cancelled covariance matrix as an average of said outer product matrix, where individual time frames are weighted as a function of the target absence signal
inverting the target-cancelled covariance matrix to obtain the inverse target-cancelled covariance matrix.

20. A method according to claim 3 where
in each subband, the inverse target-cancelled covariance matrix is estimated by processing the N target cancelling signals by an outer product to obtain an outer product matrix of order N;
estimating a target-cancelled covariance matrix as an average of said outer product matrix, where individual time frames are weighted as a function of the target absence signal
inverting the target-cancelled covariance matrix to obtain the inverse target-cancelled covariance matrix.

* * * * *